(12) United States Patent
Shigetaka et al.

(10) Patent No.: US 12,386,464 B2
(45) Date of Patent: Aug. 12, 2025

(54) PROXIMITY DETECTION DEVICE

(71) Applicant: Alps Alpine Co., Ltd., Tokyo (JP)

(72) Inventors: Hiroshi Shigetaka, Fukushima-ken (JP); Tatsumi Fujiyoshi, Miyagi-ken (JP)

(73) Assignee: Alps Alpine Co., Ltd., Tokyo (JP)

(*) Notice: Subject to any disclaimer, the term of this patent is extended or adjusted under 35 U.S.C. 154(b) by 0 days.

(21) Appl. No.: 18/479,639

(22) Filed: Oct. 2, 2023

(65) Prior Publication Data

US 2024/0028165 A1   Jan. 25, 2024

Related U.S. Application Data

(63) Continuation of application No. PCT/JP2022/009264, filed on Mar. 3, 2022.

(30) Foreign Application Priority Data

Apr. 30, 2021   (JP) ................... 2021-077787

(51) Int. Cl.
*G06F 3/043* (2006.01)
*G06F 3/041* (2006.01)
(Continued)

(52) U.S. Cl.
CPC ............ *G06F 3/044* (2013.01); *G06F 3/0412* (2013.01); *G06F 3/0414* (2013.01); *G06F 3/043* (2013.01);
(Continued)

(58) Field of Classification Search
CPC ........ G06F 3/044; G06F 3/043; G06F 3/0436; G06F 2203/04106; G06F 3/041;
(Continued)

(56) References Cited

U.S. PATENT DOCUMENTS

2008/0122455 A1* 5/2008 Ohnishi ................... G01N 9/24
                                                                73/579
2013/0033450 A1* 2/2013 Coulson ................. G06F 3/041
                                                                345/174
(Continued)

FOREIGN PATENT DOCUMENTS

JP   2019-194791   11/2019
WO   2018/139194   8/2018

OTHER PUBLICATIONS

International Search Report from Application No. PCT/JP2022/009264 dated May 31, 2022.

*Primary Examiner* — Dismery Mercedes
(74) *Attorney, Agent, or Firm* — Beyer Law Group LLP

(57) ABSTRACT

A proximity detection device with a detection distance for detecting an object separated to some extent from an operation surface is provided. The proximity detection device includes a proximity detection unit that has a piezoelectric body and first and second electrodes disposed in contact with the piezoelectric body to detect proximity of an object, a signal applying unit that causes the proximity detection unit to perform capacitance detection and ultrasonic transmission and/or ultrasonic reception by applying a plurality of signals of different frequencies to at least one of the first and second electrodes, and a charge measurement unit connected to at least one of the first and second electrodes to measure electric charge.

14 Claims, 11 Drawing Sheets

(51) Int. Cl.
*G06F 3/044* (2006.01)
*G06V 40/13* (2022.01)
*H04R 17/00* (2006.01)

(52) U.S. Cl.
CPC ........ *G06F 3/0436* (2013.01); *G06V 40/1306*
(2022.01); *H04R 17/00* (2013.01); *G06F*
*2203/04101* (2013.01); *G06F 2203/04108*
(2013.01)

(58) Field of Classification Search
CPC ......... G06F 2203/04105; G06F 3/0445; G06F
3/0446; G06F 3/047; G06F 3/0412; G06F
2203/04104; G06F 2203/04112; G06F
3/045; G06F 3/04144; G06F 3/0414;
G06F 3/0447; G06V 40/13; H04R 17/00;
H04R 17/005
See application file for complete search history.

(56) References Cited

U.S. PATENT DOCUMENTS

| | | | |
|---|---|---|---|
| 2013/0100071 A1* | 4/2013 | Wright | G06F 3/04166 |
| | | | 345/173 |
| 2015/0169136 A1* | 6/2015 | Ganti | G06F 3/017 |
| | | | 345/177 |
| 2015/0331517 A1* | 11/2015 | Filiz | G06F 3/044 |
| | | | 345/173 |
| 2016/0117034 A1* | 4/2016 | Day | G06F 3/04166 |
| | | | 345/174 |
| 2017/0371461 A1* | 12/2017 | Lee | G06F 3/0412 |
| 2018/0196982 A1* | 7/2018 | Panchawagh | G06V 40/1353 |
| 2019/0187261 A1* | 6/2019 | Peso Parada | G10K 9/12 |
| 2019/0337016 A1* | 11/2019 | Nakao | B06B 1/0215 |
| 2020/0393921 A1* | 12/2020 | Moon | G06V 40/1306 |
| 2020/0410070 A1* | 12/2020 | Strohmann | G06V 40/1306 |
| 2020/0410193 A1* | 12/2020 | Wu | G06F 1/3231 |
| 2020/0413202 A1* | 12/2020 | Kusano | B06B 1/0611 |
| 2021/0133415 A1* | 5/2021 | Kim | G06V 40/1365 |
| 2021/0220874 A1* | 7/2021 | Kojima | B06B 1/0622 |
| 2021/0231615 A1* | 7/2021 | Munemoto | G01N 29/036 |
| 2021/0319196 A1* | 10/2021 | Rhee | G01L 1/16 |
| 2021/0350099 A1* | 11/2021 | Buchan | H04L 9/3231 |
| 2024/0012519 A1* | 1/2024 | Morioka | G06F 3/044 |

* cited by examiner

PROXIMITY DETECTION DEVICE

CLAIM OF PRIORITY

This application is a Continuation of International Application No. PCT/JP2022/009264 filed on Mar. 3, 2022, which claims benefit of Japanese Patent Application No. 2021-077787 filed on Apr. 30, 2021. The entire contents of each application noted above are hereby incorporated by reference.

BACKGROUND OF THE INVENTION

1. Field of the Invention

The present invention relates to a proximity detection device.

2. Description of the Related Art

In general, the following touch panels have been used. That is, a touch panel has a pressure detection function and includes a sensor unit with a capacitive sensor and a piezoelectric sensor that is stacked on a back side of the capacitive sensor or that partially shares a component layer with the capacitive sensor, a capacitance detection circuit connected to the capacitive sensor of the sensor unit to detect a touch and a touch position in accordance with a capacitance change and to send an electric signal to a host, a charge amplifier connected to the piezoelectric sensor of the sensor unit to convert a charge signal into a voltage signal, a sample-and-hold circuit that is connected to the charge amplifier and that transmits an output of the charge amplifier while the capacitance detection circuit deactivates the capacitive sensor whereas holds and transmits, when the deactivation of the capacitive sensor is changed to activation of the capacitive sensor by the capacitance detection circuit, an output of the charge amplifier obtained immediately before the change, and an AD converter that is connected to the sample-and-hold circuit and that digitally converts an output of the sample-and-hold circuit and sends the output to the host (refer to, Japanese Unexamined Patent Application Publication No. 2019-194791).

Here, a touch panel with a pressure detection function may detect a touch and a touch position on a touch surface, but the touch panel may not detect an object, such as a hand, that is some distance away from the touch surface. In other words, a distance at which an object may be detected in a direction away from an operation surface, such as the touch surface, is limited.

SUMMARY OF THE INVENTION

The present invention provides a proximity detection device with a detection distance for detecting an object separated to some extend from an operation surface.

The proximity detection device according to an embodiment of the present invention includes a proximity detection unit that has a piezoelectric body and first and second electrodes disposed in contact with the piezoelectric body to detect proximity of an object, a signal applying unit that causes the proximity detection unit to perform capacitance detection and ultrasonic transmission and/or ultrasonic reception by applying a plurality of signals of different frequencies to at least one of the first and second electrodes, and a charge measurement unit connected to at least one of the first and second electrodes to measure electric charge.

A proximity detection device with a detection distance for detecting an object separated to some extend from an operation surface may be provided.

DESCRIPTION OF THE PREFERRED EMBODIMENTS

The following is a description of an embodiment to which a proximity detection device according to the present invention is applied.

Embodiment

Figure 1:
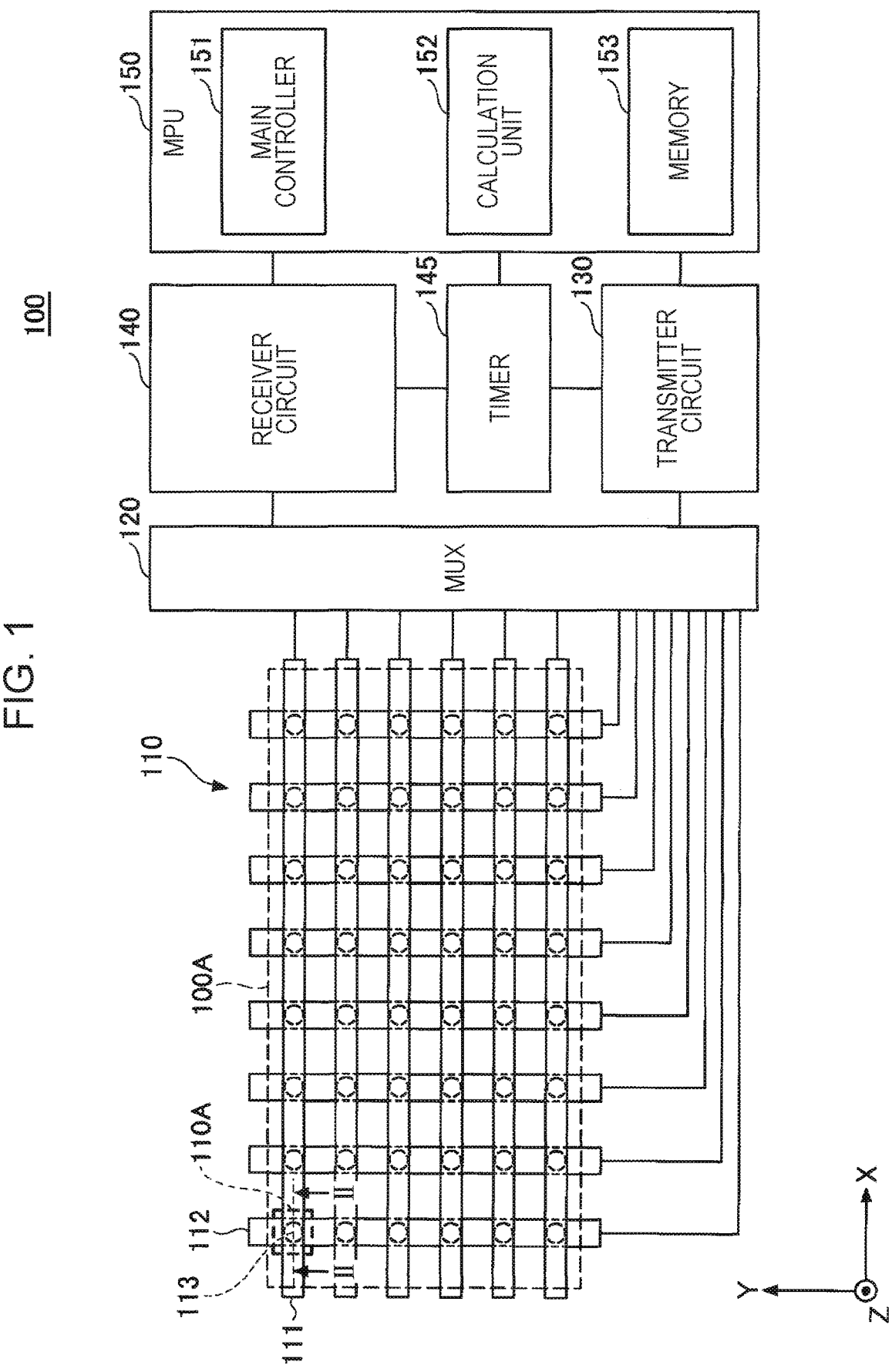
FIG. 1 is a diagram illustrating an example of a proximity detection device according to an embodiment.
Figure 2:
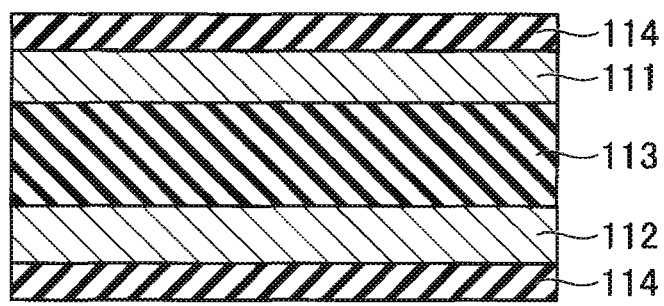
FIG. 2 is a diagram illustrating a configuration in a cross-section viewed from a II-II arrow in FIG. 1.

FIG. 1 is a diagram illustrating an example of a proximity detection device 100 according to an embodiment. FIG. 2 is a diagram illustrating a configuration in a cross-section viewed from a II-II arrow in FIG. 1. In the following, a description will be made while the XYZ coordinate system is defined. A direction parallel to an X axis (X direction), a direction parallel to a Y axis (Y direction), and a direction parallel to a Z axis (Z direction) are orthogonal to one another. For convenience of explanation, a side in an −Z direction may be referred to as a lower side and a side in a +Z direction as an upper side, but this does not represent a universal vertical relationship. Furthermore, a plan view means to view an XY plane. Moreover, lengths, thicknesses, etc. of each component may be exaggerated in the following to make a configuration easier to understand.

The proximity detection device 100 includes a proximity detection unit 110, an MUX (multiplexer) 120, a transmitter circuit 130, a receiver circuit 140, a timer 145, and an MPU (Micro Processing Unit) 150. The MUX 120, the transmitter circuit 130, and the MPU 150 are an example of a signal applying unit. The signal applying unit causes the proximity detection unit 110 to perform capacitance detection and ultrasonic transmission and/or ultrasonic reception by applying signals of different frequencies to at least first electrodes 111 or second electrodes 112.

The proximity detection device 100 has an operation surface 100A. The operation surface 100A serves as a reference plane when the proximity detection device 100 detects the proximity of an object, and is a surface of a panel, such as a housing of an electronic device including the proximity detection device 100, for example. The electronic device may be any electronic device that includes a touch panel, for example, a smartphone or a tablet computer. The proximity detection unit 110 is disposed on a back side of the operation surface 100A, and the operation surface 100A is located on a front side of the proximity detection unit 110. Here, a case where an object is a hand of a user of the electronic device including the proximity detection device 100 will be described.

The proximity detection device 100 detects the proximity of a user's hand to the operation surface 100A. Here, proximity means approach of a hand without touching the operation surface 100A, or a touch on the operation surface 100A with a hand.

The proximity detection device 100 detects an amount of charge corresponding to capacitance between a hand and the proximity detection unit 110, and performs profiling and image detection based on the amount of charge to calculate a position of the hand that is an object. The calculation of a hand position based on capacitance means that a position of a hand in contact (touch) with the operation surface 100A and a position of the hand when the hand is not in contact with the operation surface 100A but very close to the operation surface 100A may be calculated. The hand position calculated based on capacitance may be represented in three dimensions.

Furthermore, the proximity detection device 100 transmits ultrasonic waves toward the hand from a plurality of portions of the proximity detection unit 110 and calculates distances from the operation surface 100A to a plurality of points on the hand based on round-trip times until reflected waves are received. In other words, the proximity detection unit 110 performs an ultrasonic transmission followed by an ultrasonic reception by reflected waves. The proximity detection device 100 may further calculate distribution of hand positions using the calculated distances.

There is a limit to a range in which changes in capacitance due to hand proximity may be detected in a direction away from the operation surface 100A. The calculation of a hand position based on the round-trip times of ultrasonic waves is difficult when the hand position is too close to the operation surface 100A. Therefore, the proximity detection device 100 calculates a distance to the hand using ultrasonic waves when the distance from the operation surface 100A to the hand is longer than a predetermined distance, and calculates the distance to the hand using capacitance when the distance from the operation surface 100A to the hand is equal to or shorter than the predetermined distance. In determining whether the distance from the operation surface 100A to the hand is longer than the predetermined distance, as an example, a plurality of distances from the operation surface 100A to a plurality of points on the hand are obtained based on round-trip times of ultrasonic waves, and it is determined whether an average of the plurality of distances is longer than the predetermined distance. The predetermined distance is from 3 cm to 10 cm as an example. Furthermore, instead of an average of a plurality of distances, it may be determined whether a minimum of a plurality of distances is longer than the predetermined distance or whether a distance at a certain point is longer than the predetermined distance.

The proximity detection device 100 may calculate a two-dimensional profile representing a two-dimensional distribution of a hand shape or a three-dimensional image representing a three-dimensional distribution of the hand shape when the user's hand approaches the operation surface 100A. Such a two-dimensional profile or a three-dimensional image of the hand shape may be obtained based on distances from the operation surface 100A to a plurality of points on the hand, which may be calculated based on, among other things, round-trip times which are from transmissions of ultrasonic waves from a plurality of portions of the proximity detection unit 110 to receptions of reflected waves.

The two-dimensional profile of the hand shape represents, for example, a two-dimensional distribution of a hand position obtained according to distribution of distances in the Z direction from the operation surface 100A to the plurality of positions of the hand in an XZ plane in a certain Y coordinate or in a YZ plane in a certain X coordinate. Furthermore, the three-dimensional image of the hand shape represents a three-dimensional distribution of a hand position obtained according to distribution of distances in the Z direction from the operation surface 100A to the plurality of positions of the hand.

Moreover, the proximity detection device 100 shares the same detection unit that detects a distance to the hand using ultrasonic waves and that detects a hand position using capacitance, and uses the MUX 120, the transmitter circuit 130, the receiver circuit 140, the timer 145, and the MPU 150 as the common detection unit.

<Proximity Detection Unit 110>

The proximity detection unit 110 has piezoelectric bodies and first and second electrodes arranged in contact with the piezoelectric bodies to detect proximity of an object. It is assumed here that the term "piezoelectric body" in this application refers to a substance having piezoelectricity, and examples of the piezoelectric body include an electret having piezoelectricity. In this embodiment, the proximity detection unit 110 includes first electrodes 111, second electrodes 112, piezoelectric bodies 113, and substrates 114 and detects the proximity of a hand as an object. The first electrodes 111 are linear electrodes (electrode lines) extending in the X direction, and the plurality of first electrodes 111 are arranged at equal intervals in the Y direction. The X direction is an example of a first direction and the Y direction is an example of a second direction. The second electrodes 112 are linear electrodes (electrode lines) extending in the Y direction, and the plurality of second electrodes 112 are arranged at equal intervals in the X direction. The first and second electrodes 111 and 112 are spaced in the Z direction and intersect in plan view, and the piezoelectric bodies 113 are arranged between the first and second electrodes 111 and 112 at the intersections 110A which are portions where the first and second electrodes 111 and 112 intersect in plan view. In other words, the first and second electrodes 111 and 112 are arranged to be in contact with the piezoelectric bodies 113, and the first and second electrodes 111 and 112 sandwich the piezoelectric bodies 113 therebetween.

The first and second electrodes 111 and 112 are used both to detect a distance to a hand using ultrasonic waves and to detect a position of the hand using capacitance. The piezoelectric bodies 113 are used to detect a distance to a hand using ultrasonic waves. In other words, the proximity detection unit 110 also has a function of ultrasonic detection since the electrodes for capacitance detection also serve as electrodes for the piezoelectric bodies.

The intersections 110A where the first electrodes 111 and the second electrodes 112 intersect in plan view are arranged in a matrix as illustrated in FIG. 1. Since the substrates 114 are disposed on the first electrodes 111 and under the second electrodes 112, a cross-sectional configuration of each of the intersections 110A includes the substrate 114, a corresponding one of the second electrodes 112, a corresponding one of the piezoelectric bodies 113, a corresponding one of the first electrodes 111, and the substrate 114 which are stacked from bottom to top, as illustrated in FIG. 2.

The first and second electrodes 111 and 112 are wire electrodes made of metal, such as copper or aluminum, as an example. As an example, the proximity detection unit 110 may be fabricated by preparing the substrate 114 with the plurality of first electrodes 111 on one surface and the substrate 114 with the plurality of second electrodes 112 on one surface, and pasting the two substrates 114 together with the piezoelectric bodies 113 sandwiched therebetween at the intersections 110A. At the intersections 110A, the piezoelectric bodies 113 are arranged between the first and second electrodes 111 and 112, but outside the intersections 110A, the first and second electrodes 111 and 112 are insulated by an insulating layer or the like.

The piezoelectric bodies 113 are disposed to generate ultrasonic vibrations. Ultrasonic waves are used because it is easy to measure a distance to a hand located directly above the piezoelectric bodies 113 by radiating highly directional ultrasonic waves directly above the individual piezoelectric bodies 113 (in the +Z direction). As the piezoelectric bodies 113, elements which produce distortion by application of a voltage, such as piezoelectric elements, may be used, for example. At the intersections 110A, the first and second electrodes 111 and 112 are disposed on and under the piezoelectric body 113, respectively, and therefore, by applying an AC signal for ultrasonic waves between the first and second electrodes 111 and 112, the piezoelectric bodies 113 may resonate and transmit ultrasonic waves directly above the piezoelectric bodies 113.

The AC signal for ultrasonic waves is an example of a second frequency signal for ultrasonic transmission and at a frequency that may resonate the piezoelectric bodies 113 arranged between the first and second electrodes 111 and 112. The frequency of the AC signal for ultrasonic waves is several tens of kHz to several hundreds of kHz as an example, and the piezoelectric bodies 113 vibrate at a frequency equal to the frequency of the AC signal. By applying an AC signal for ultrasonic waves between the first and second electrodes 111 and 112, the piezoelectric bodies 113 may resonate to generate ultrasonic waves at a desired frequency.

Instead of the piezoelectric bodies 113, electrets with piezoelectric properties may be used. In this case, the electrets may generate ultrasonic waves in the same way as the piezoelectric bodies 113 by applying an AC signal for ultrasonic waves while being sandwiched between the first and second electrodes 111 and 112.

The substrates 114 may be flexible or rigid type wiring substrates, insulating sheets, or the like. The proximity detection unit 110 may be made transparent for visible light.

In this case, the first and second electrodes 111 and 112 are made of a transparent conductive material, such as ITO (Indium Tin Oxide), the piezoelectric bodies 113 are transparent, and the two substrates 114 are transparent.

<MUX 120>

The MUX 120 is connected to the first and second electrodes 111 and 112 via wiring, as well as to the transmitter circuit 130 and the receiver circuit 140. The MUX 120 selects one or more of the first electrodes 111 and one or more of the second electrodes 112 to switch the first and second electrodes 111 and 112 to be connected to the transmitter circuit 130 and the receiver circuit 140 in a time-series manner. The switching of the selection of the first and second electrodes 111 and 112 by the MUX 120 is performed under control of the MPU 150.

<Transmitter Circuit 130>

When detecting a distance to a hand by ultrasonic waves, the transmitter circuit 130 outputs, under control of the MPU 150, an AC signal for ultrasonic waves between the individual first electrodes 111 and the individual second electrodes 112 via the MUX 120 and also outputs the AC signal to the timer 145. When performing position detection using capacitance, the transmitter circuit 130 outputs, under control of the MPU 150, an AC signal of a frequency for capacitance detection to the individual first electrodes 111 or the individual second electrodes 112 via the MUX 120. Since the detection of a distance to a hand using ultrasonic waves and the position detection using capacitance are separately performed, for example, in a time-division manner, the transmitter circuit 130 selectively applies an AC signal for ultrasonic waves and an AC signal of a frequency for capacitance detection to the individual first electrodes 111 or the individual second electrodes 112.

The AC signal of the frequency for capacitance detection is an example of a first frequency signal for capacitance detection, and the AC signal for ultrasonic waves is an example of a second frequency signal for ultrasonic wave transmission. The frequency of the AC signal of a frequency for capacitance detection is several tens of kHz to several hundreds of kHz similarly to the AC signal for ultrasonic waves as an example as long as the frequency of the AC signal of a frequency for capacitance detection is out of the resonance frequency of the piezoelectric bodies 113. This is because resonance of the piezoelectric bodies 113 is suppressed when the position detection is performed based on capacitance.

<Receiver Circuit 140>

A charge measurement unit is connected to at least the first electrodes 111 or the second electrodes 112 so as to measure an electric charge. In this embodiment, the receiver circuit 140 corresponds to the charge measurement unit. When a distance to a hand is detected using ultrasonic waves, the receiver circuit 140 acquires, under control of the MPU 150, waveforms generated by electric charges between the individual first electrodes 111 and the individual second electrodes 112 via the MUX 120 and outputs the waveforms to the timer 145. When the position detection is performed using capacitance, the receiver circuit 140 detects, under control of the MPU 150, an amount of charge corresponding to the capacitance between the individual first electrode 111 and the individual second electrode 112 via the MUX 120 and outputs the amount of charge to the MPU 150.

<Timer 145>

When a distance to a hand is detected by ultrasonic waves, the timer 145 measures, under control of the MPU 150, time differences between waveforms of an AC signal supplied from the transmitter circuit 130 and waveforms supplied from the receiver circuit 140 as round-trip times of the ultrasonic waves for the individual first electrodes 111 and the individual second electrodes 112. The timer 145 outputs the round-trip times measured for the individual first electrodes 111 and the individual second electrodes 112 to the MPU 150.

<MPU 150>

The MPU 150 has a main controller 151, a calculation unit 152, and a memory 153. The MPU 150 is realized by a computer that includes a CPU (Central Processing Unit), a RAM (Random Access Memory), a ROM (Read Only Memory), an I/O interface, and an internal bus. The main controller 151 and the calculation unit 152 are functional blocks indicating functions of programs executed by the MPU 150. Furthermore, the memory 153 functionally indicates a memory of the MPU 150.

The main controller 151 is a processing unit that controls processing of the MPU 150 and executes processes other than those executed by the calculation unit 152, for example.

The calculation unit 152 calculates a distance between an object (e.g., hand) and the proximity detection unit 110. The MPU 150 causes the MUX 120 to switch a selection of the first and second electrodes 111 and 112 when detecting the distance to the hand using ultrasonic waves or when detecting a position using capacitance. The MPU 150 is connected to the first and second electrodes 111 and 112 selected by the MUX 120, and therefore, the calculation unit 152 is connected to the first and second electrodes 111 and 112 selected by the MUX 120 via the transmitter circuit 130 or the receiver circuit 140.

The signal applying unit selectively applies a first frequency signal for capacitance detection and a second frequency signal for ultrasonic transmission. The calculation unit 152 obtains a result of capacitance detection and/or ultrasonic detection based on the signal selected by the signal applying unit and the charge measured by the receiver circuit 140 (charge measurement unit), and in addition, calculates a distance between an object and the proximity detection unit 110 based on the obtained result. Specifically, when the first frequency signal is selected by the signal applying unit, the calculation unit 152 obtains the result of the capacitance detection based on the amount of charge measured by the receiver circuit 140 and calculates a distance between the object and the proximity detection unit 110 based on the obtained result. On the other hand, when the second frequency signal is selected by the signal applying unit, the calculation unit 152 calculates the distance between the object and the proximity detection unit 110 based on a period of time from ultrasonic transmission to ultrasonic reception based on the charge measured by the receiver circuit 140. In other words, the calculation unit 152 is a common calculation unit that is capable of determining results of both the capacitance detection and the ultrasonic detection using the amount of charge of the first electrodes 111 and/or the second electrodes 112 measured by the charge measurement unit (receiver circuit 140).

Furthermore, the signal applying unit selects the second frequency signal and causes the proximity detection unit 110 to transmit and/or receive ultrasonic waves, and selects the first frequency signal and causes the proximity detection unit 110 to perform capacitance detection when the distance between the object and the proximity detection unit 110 calculated by the calculation unit 152 is a predetermined distance or shorter. Specifically, the MPU 150, as an example, controls the transmitter circuit 130 to output an AC signal for ultrasonic waves between the individual first electrodes 111 and the individual second electrodes 112 while switching a selection of the first electrodes 111 and the second electrodes 112 performed by the MUX 120 in a time-series manner, and obtains round-trip times from the timer 145. The calculation unit 152 then calculates distances from the operation surface 100A to portions of a hand directly above the intersections 110A.

When an average of all the distances is longer than a predetermined distance, for example, the signal applying unit causes the proximity detection unit 110 to transmit and receive ultrasonic waves so that a distance to the hand is calculated using the ultrasonic waves. Furthermore, when the calculation unit 152 determines that the average of all the distances is equal to or shorter than the predetermined distance, the signal applying unit causes the proximity detection unit 110 to perform capacitance detection so that a position of the object is calculated using capacitance. Note that it is not necessarily the case that the determination is made using the average of all the distances, and the determination may be made based on a minimum of all the distances or a determination as to whether a distance between the object and the proximity detection unit 110 at a certain point is shorter than a predetermined distance may be made. Furthermore, in this embodiment, the timer 145 is provided separately from the MPU 150, but the MPU 150 itself may have a function of measuring time, and in this case, the timer 145 is not required.

When detecting the distance to the hand using ultrasonic waves, the MPU 150 controls the transmitter circuit 130 to output an AC signal for ultrasonic waves between the individual first electrodes 111 and the individual second electrodes 112 while the MUX 120 switches a selection of the first and second electrodes in a time-series manner, causes the receiver circuit 140 to acquire a waveform produced by the electric charge, and obtains round-trip times from the timer 145.

The calculation unit 152 calculates distances from the operation surface 100A to points where the ultrasonic waves are reflected based on the round-trip times and a sound speed. The points where the ultrasonic waves are reflected are portions of the hand located directly above the piezoelectric bodies 113 at the intersections 110A of the first and second electrodes 111 and 112 selected by the MUX 120.

Furthermore, based on the obtained distances, the calculation unit 152 may further detect a two-dimensional profile of a hand shape or a three-dimensional image of the hand shape. Specifically, the calculation unit 152 detects a two-dimensional profile or a three-dimensional image of the object, that is, the hand, based on the amount of charge measured by the receiver circuit 140 (charge measurement unit) and/or the period of time between ultrasonic transmission and ultrasonic reception. By detecting the two-dimensional profile or the three-dimensional image, the shape of the hand may be recognized and a movement of the user's hand may be detected.

When performing the position detection using capacitance, the MPU 150 controls the transmitter circuit 130 to output an AC signal of a frequency for capacitance detection between the individual first electrodes 111 and the individual second electrodes 112 while the MUX 120 switches a selection of the first electrodes 111 and the second electrodes 112 in a time-series manner, and also controls the receiver circuit 140 to detect capacitance obtained from charge between the individual first electrodes 111 and the individual second electrodes 112.

Note that the change of a detection method using the predetermined distance is merely an example, and the MPU 150 may perform switching between a detection of the distance to the hand by ultrasonic waves and a position detection using capacitance in a time-division manner. In this case, the signal applying unit performs switching between the first and second frequency signals in a time-division manner. By executing the two types of detection method in a time-division manner, a detection of the distance to the hand using ultrasonic waves and a detection of the hand position using capacitance may always be performed, regardless of the distance from the operation surface 100A to the hand.

The memory 153 stores programs and data required by the main controller 151 and the calculation unit 152 to perform the processing described above, the round-trip times input to the MPU 150 from the timer 145, the distances calculated by the calculation unit 152, the capacitance, and data representing the two-dimensional profile or the three-dimensional image of the hand shape.

<Processing Executed by MPU 150>

Figure 3:
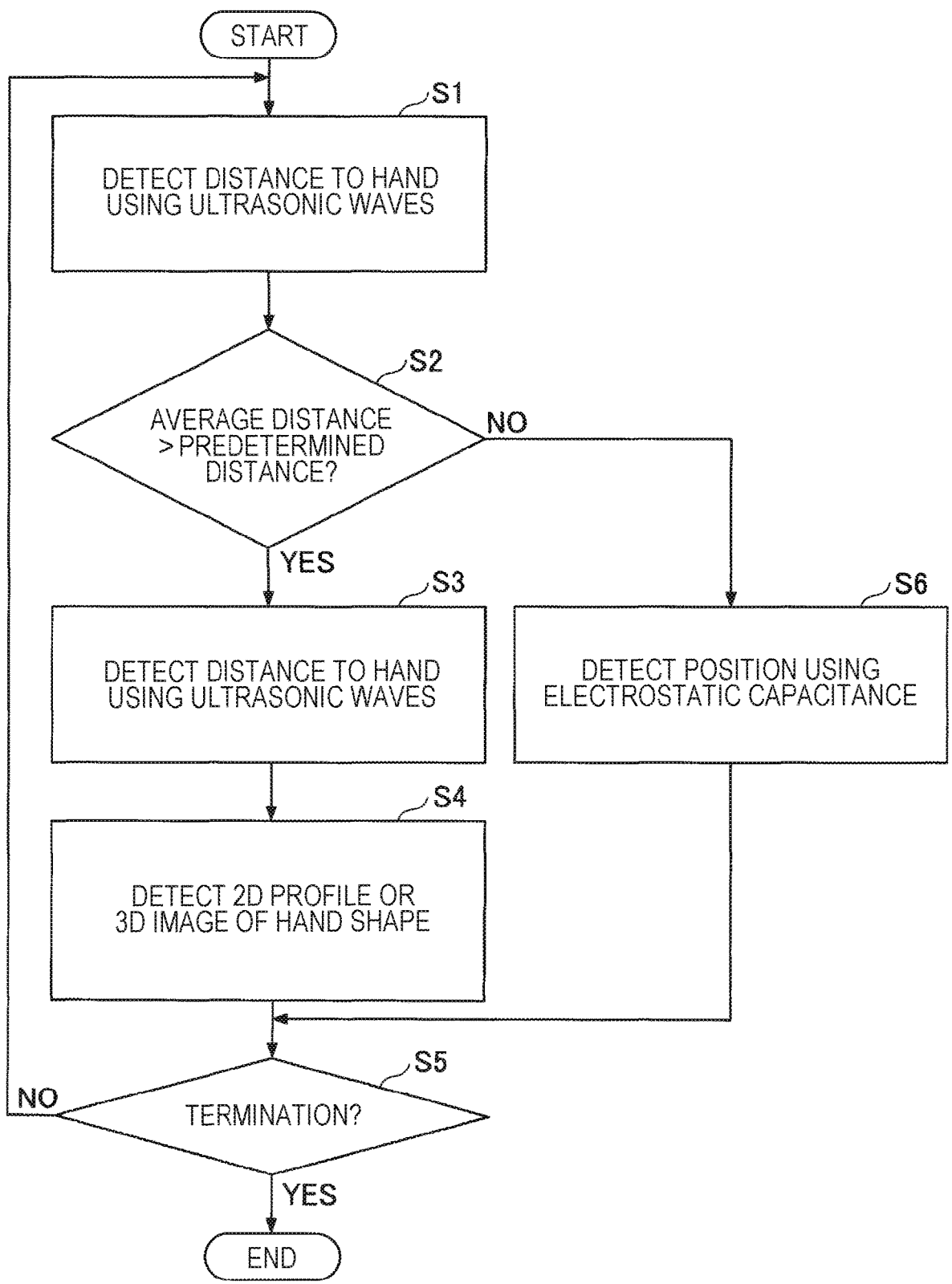
FIG. 3 is a flowchart of an example of a process executed by an MPU.

FIG. 3 is a flowchart of an example of a process executed by the MPU 150.

When the process is started, the calculation unit 152 calculates a distance to a hand using ultrasonic waves (step S1). The calculation unit 152 calculates distances from the operation surface 100A to portions of the hand directly above the individual intersections 110A. The process in step S1 is performed to determine whether to detect a distance to the hand using ultrasonic waves or a position using capacitance.

The MPU 150 determines whether an average of all the distances is longer than a predetermined distance (step S2).

When determining that the average of all the distances is longer than the predetermined distance (S2: YES), the MPU 150 detects the distance to the hand using ultrasonic waves (step S3). This is because a hand position is too far away to be detected using capacitance, and therefore, the calculation is based on round-trip times of the ultrasonic waves. Note that the details of the detection of the distance to the hand using ultrasonic waves have been described above and are omitted here.

The calculation unit 152 detects a two-dimensional profile or a three-dimensional image of a hand shape based on the distance obtained in step S2 (step S4). By this, a two-dimensional profile or a three-dimensional image of the hand approaching the operation surface 100A is obtained.

After the process in step S4, the MPU 150 determines whether to terminate a series of processes (step S5). It is determined that the series of processes is to be terminated in step S5 when a power source of an electronic device including the proximity detection device 100 is turned off.

When the MPU 150 determines that the series of processes is not to be terminated (S5: NO), the flow returns to step S1. This is in order to continue the process according to a subsequent position of the hand.

Furthermore, when determining in step S2 that the average of all the distances is not longer than the predetermined distance (S2: NO), the MPU 150 performs the position detection using capacitance (step S6). This is because a position of the hand is too close to be determined using round-trip times of ultrasonic waves, and therefore, the position is determined using capacitance. Note that, when the MPU 150 terminates the process in step S6, the flow proceeds to step S5.

As described above, the proximity detection device 100 has the piezoelectric bodies 113 at the intersections 110A of the first and second electrodes 111 and 112, and when the position of the hand is equal to or shorter than the predetermined distance, position detection is performed using the capacitance obtained from the charge of the first and second electrodes 111 and 112, and when the hand position is longer than the predetermined distance, the distance to the hand is calculated based on the round-trip times of the ultrasonic waves transmitted by driving the piezoelectric bodies 113. When the detection of the distance to the hand using ultrasonic waves is employed, a distance much farther than is possible with the capacitance-based position detection may be detected.

Therefore, the proximity detection device 100 with a detection distance that may detect an object that is some distance away from the operation surface 100A may be provided.

Furthermore, the proximity detection device 100 shares the same detection unit that detects the distance to the hand using ultrasonic waves and that detects the hand position using electrostatic capacitance. The common detection unit includes the MUX 120, the transmitter circuit 130, the receiver circuit 140, the timer 145, and the MPU 150. In particular, the receiver circuit 140 may serve as the charge measurement unit, and therefore, the charge detection commonly required for the capacitance detection and the ultrasonic wave detection may be performed by the single component. Therefore, the detection of the distance to the hand using ultrasonic waves and the detection of the hand position using capacitance may be executed by the same circuit, and a hand position near the operation surface 100A based on capacitance and a hand position at some distance away from the operation surface 100A using ultrasonic waves may be obtained with a simple configuration. In addition, since the same detection unit detects the distance to the hand using ultrasonic waves and detects the hand position using capacitance, the two different detection methods may attain the same detection accuracy. This is a solution to a problem that a device configuration is complicated and large when the distance to the hand is detected using ultrasonic waves and the hand position is detected using capacitance by different detection units.

Furthermore, the proximity detection unit 110 is configured such that the first and second electrodes 111 and 112 sandwich the piezoelectric bodies 113 therebetween, and therefore, an AC signal may be easily applied to the piezoelectric bodies 113 by using the first and second electrodes 111 and 112 for capacitance detection. Note that the proximity detection unit 110 may be configured such that the first and second electrodes 111 and 112 sandwich piezoelectric electrets therebetween. Furthermore, since the MUX 120 connected to the first and second electrodes 111 and 112, the transmitter circuit 130, the receiver circuit 140, and the MPU 150 are used for capacitance detection, the proximity detection device 100 also capable of detecting ultrasonic waves may be realized by only adding the timer 145 and changing the program executed by the MPU 150. This is a solution to the problem that the device configuration is complicated and becomes large when the detection of the distance to the hand using ultrasonic waves and the detection of the hand position using capacitance are performed by different proximity detection units.

Furthermore, since the proximity detection unit 110 receives ultrasonic waves that are reflected waves after transmitting ultrasonic waves, a proximity detection unit for transmission and a proximity detection unit for reception are not required to be separately provided, and the single proximity detection unit 110 may perform transmission and reception of ultrasonic waves and the transmission and the reception of ultrasonic waves may be realized with a simple configuration.

Furthermore, the signal applying unit selectively applies the first frequency signal which is for capacitance detection and the second frequency signal which is for ultrasonic transmission. In this embodiment, the MPU 150, the MUX 120, and the transmitter circuit 130, which correspond to the signal applying unit, selectively apply an AC signal for capacitance detection and an AC signal for transmission of ultrasonic waves. The calculation unit 152 obtains a result of capacitance detection and/or ultrasonic detection based on the signal selected by the signal applying unit (MPU 150, MUX 120, and transmitter circuit 130) and the measured charge, and in addition, calculates a distance between the object, that is, the hand, and the proximity detection unit 110 based on the obtained result. Therefore, a simple configuration can be achieved in which one MUX 120, one transmitter circuit 130, and one receiver circuit 140 may be used for both the capacitance detection and the ultrasonic detection.

In addition, since the signal applying unit (MPU 150, MUX 120, and transmitter circuit 130) selects the AC signal for ultrasonic transmission and causes the proximity detection unit 110 to perform ultrasonic transmission and reception, and when a distance between the object and the proximity detection unit 110 calculated by the calculation unit 152 becomes equal to or shorter than the predetermined distance, the signal applying unit selects the AC signal for capacitance detection and causes the proximity detection unit 110 to perform the capacitance detection, a simple configuration is realized in which one proximity detection unit 110, one MUX 120, one transmitter circuit 130, and one receiver circuit 140 may be used for both the capacitance detection and the ultrasonic detection.

The timer 145 is further provided to measure a period of time (round-trip time) from a time when the transmitter circuit 130 applies the second frequency signal to a time when the receiver circuit 140 measures electric charge based on the AC signal for ultrasonic transmission reflected by the object, and the calculation unit 152 calculates the distance between the object and the proximity detection unit 110 based on the period of time measured by the timer 145, and therefore, the distance to the object, that is, the hand, may be easily detected based on the round-trip times of the ultrasonic waves.

Furthermore, the transmitter circuit 130 and the receiver circuit 140 may also perform switching between the AC signal for capacitance detection and the AC signal for ultrasonic wave detection in a time-division manner, and therefore, a simple configuration may be realized in which one transmitter circuit 130 and one receiver circuit 140 may be used for both the capacitance detection and the ultrasonic wave detection in a time-division manner.

Since the proximity detection unit 110 at least includes one piezoelectric body 113 and one first electrode 111 and one second electrode 112 which are disposed in contact with the piezoelectric body 113, as described above, it is not necessarily the case that a plurality of first electrodes 111 and a plurality of second electrodes 112 are required as illustrated in FIG. 1. However, since distance data at a plurality of points is required to detect a two-dimensional profile or a three-dimensional image of the object, the proximity detection unit 110 may include a plurality of first electrodes 111 and a plurality of second electrodes 112 as illustrated in FIG. 1. In this case, since the plurality of first electrodes 111, one or more piezoelectric bodies 113, and the plurality of second electrodes 112 are disposed and each of the one or more piezoelectric bodies 113 is disposed between at least one of the plurality of first electrodes 111 and at least one of the plurality of second electrodes 112, the distance to the object, that is, the hand, may be measured by transmitting and receiving ultrasonic waves with the one or more piezoelectric bodies 113 disposed between the plurality of first electrodes 111 and the plurality of second electrodes 112. Here, the number of piezoelectric bodies 113 is one when a sheet layer of the piezoelectric body 113 is disposed over an entire surface between a layer with the first electrodes 111 and a layer with the second electrodes 112, for example.

The first electrodes 111 extend in the X direction and are arranged in the Y direction that intersects with the X direction, the second electrodes 112 extend in the Y direction and are arranged in the X direction, and the piezoelectric body 113 is sandwiched between the first and second electrodes 111 and 112 at the intersections 110A where the first and second electrodes 111 and 112 intersect. Accordingly, a configuration that may easily apply an AC signal for ultrasonic wave transmission to the piezoelectric body 113 and easily detect reflected waves may be realized using the first and second electrodes 111 and 112 for capacitance detection. Note that the capacitance detection may be performed by self-capacitance detection or by mutual capacitance detection. The first and second electrodes 111 and 112 may not intersect with each other, and a structure constituted such that a piezoelectric body 113 is sandwiched between first and second electrodes 111 and 112 may be arranged in a number of portions in a plane.

Since the calculation unit 152 detects a two-dimensional profile or a three-dimensional image of the object based on the measured amount of electric charge, the proximity detection device 100 capable of easily recognizing a shape and a movement of the object, that is, the hand, near the operation surface 100A may be provided. Specifically, the proximity detection device 100 may perform detailed image detection on an object by combining the capacitance detection and the ultrasonic detection, and may enable object detection at a wide range of distance by performing the capacitance detection in a region close to a touch and the ultrasonic detection in a region some distance away.

Note that, although the proximity detection unit 110 includes the plurality of first electrodes 111, the plurality of second electrodes 112, and one or more piezoelectric bodies 113 in the foregoing description, the proximity detection unit 110 may be minimally configured with one first electrode 111, one second electrode 112, and one piezoelectric body 113. The number of first electrodes 111 is not required to be equal to the number of second electrodes 112.

Furthermore, although the piezoelectric bodies 113 are disposed at the individual intersections 110A of the plurality of first electrodes 111 and the plurality of second electrodes 112 in the foregoing description, the piezoelectric bodies 113 may be disposed at only a number of the intersections 110A. For example, the piezoelectric bodies 113 may be disposed at every other intersections 110A in the X and/or Y direction. The number of piezoelectric bodies 113 is set according to application of the proximity detection device 100, as the number relates to detection of a hand position using ultrasonic detection and resolution of the two-dimensional profile and the three-dimensional image.

That is, each of the one or more piezoelectric bodies 113 is disposed between at least one of the plurality of first electrodes 111 and at least one of the plurality of second electrodes 112.

<Modification of Intersections 110A>

FIGS. 4A to 7C are diagrams illustrating modifications of the intersections 110A. In FIGS. 4A to 7C, configurations of cross-sections corresponding to the cross-section of one of the intersections 110A illustrated in FIG. 2 (the cross-section viewed from the II-II arrow in FIG. 1) are illustrated. The intersection 110A illustrated in FIG. 2 may be modified into the configuration shown in FIG. 4A or FIG. 7C.

Figure 4A:
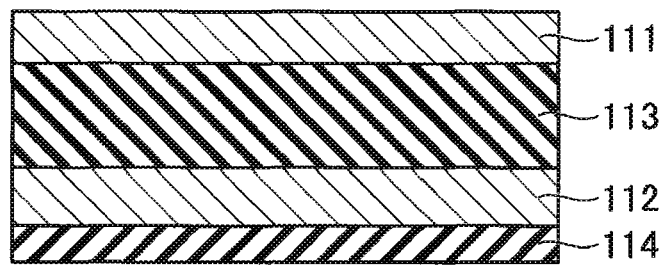
FIG. 4A is a diagram illustrating a modification of an intersection.

An intersection 110A in FIG. 4A has a first electrode 111, a second electrode 112, a piezoelectric body 113, and a substrate 114. The intersection 110A in FIG. 4A is configured without the uppermost substrate 114 of the intersection 110A illustrated in FIG. 2. For example, the piezoelectric body 113 and the first electrode 111 are disposed on the substrate 114 with the second electrode 112 on one surface thereof.

Figure 4B:
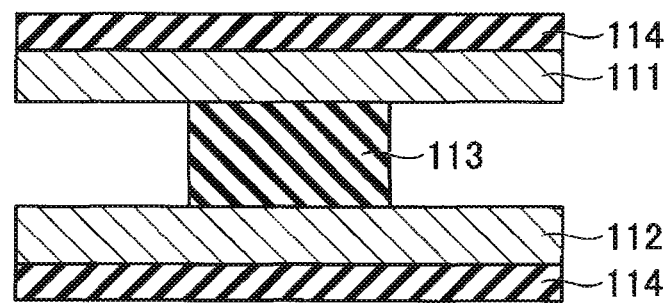
FIG. 4B is a diagram illustrating a modification of the intersection.

An intersection 110A in FIG. 4B has a first electrode 111, a second electrode 112, a piezoelectric body 113, and two substrates 114, and is configured such that the piezoelectric body 113 at the intersection 110A illustrated in FIG. 2 is made thinner.

Figure 4C:
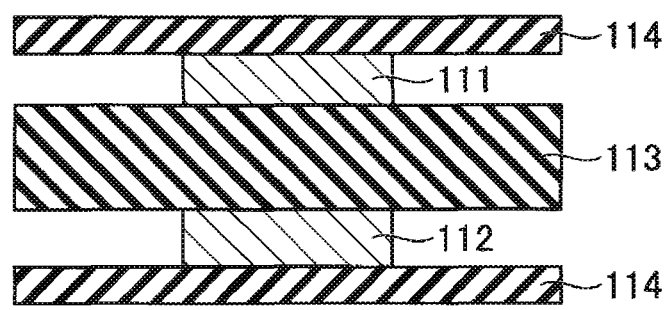
FIG. 4C is a diagram illustrating a modification of the intersection.

An intersection 110A in FIG. 4C has a first electrode 111, a second electrode 112, a piezoelectric body 113, and two substrates 114, and is configured such that the first and second electrodes 111 and 112 at the intersection 110A illustrated in FIG. 2 are made thinner.

Figure 4D:
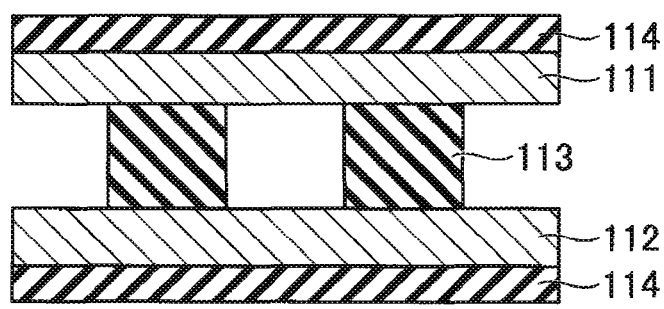
FIG. 4D is a diagram illustrating a modification of the intersection.

An intersection 110A in FIG. 4D has a first electrode 111, a second electrode 112, piezoelectric bodies 113, and two substrates 114, and is configured such that the piezoelectric body 113 at the intersection 110A illustrated in FIG. 2 is divided into two pieces.

Figure 5A:
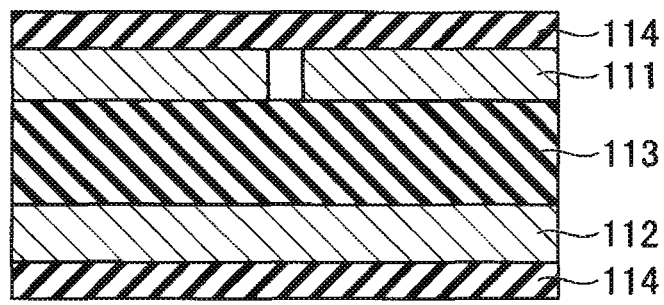
FIG. 5A is a diagram illustrating a modification of the intersection.

An intersection 110A in FIG. 5A has first electrodes 111, a second electrode 112, a piezoelectric body 113, and two substrates 114. In the cross-section illustrated in FIG. 5A, the first electrode 111 of the intersection 110A illustrated in FIG. 2 is divided into two pieces. The first electrode 111 may be divided into two pieces or the first electrode 111 may be shaped like a spiral in plan view, for example.

Figure 5B:
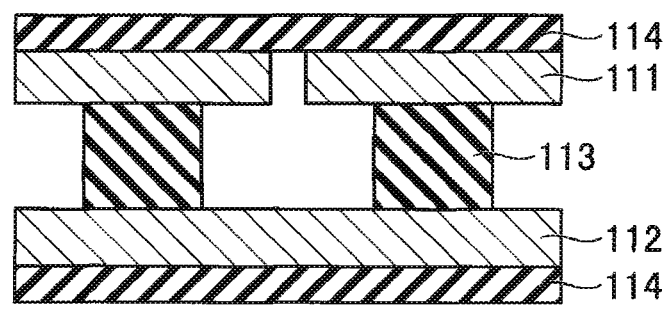
FIG. 5B is a diagram illustrating a modification of the intersection.

An intersection 110A in FIG. 5B has first electrodes 111, a second electrode 112, piezoelectric bodies 113, and two substrates 114, and the piezoelectric body 113 illustrated in FIG. 5A is divided into two pieces.

Figure 5C:
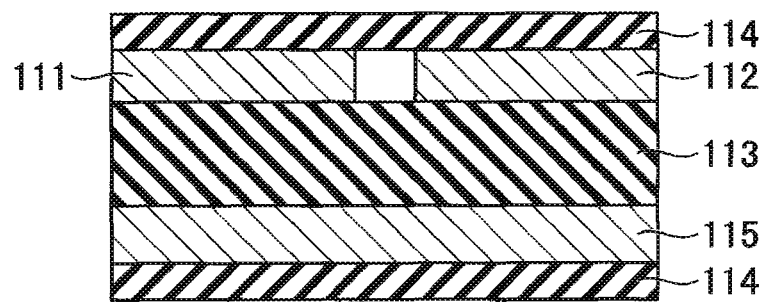
FIG. 5C is a diagram illustrating a modification of the intersection.

An intersection 110A in FIG. 5C has a first electrode 111, a second electrode 112, a piezoelectric body 113, two substrates 114, and a shield electrode 115. The shield electrode 115 is an example of a third electrode for shielding. In the intersection 110A illustrated in FIG. 5C, the second electrode 112 is disposed on the piezoelectric body 113 together with the first electrode 111, and the shield electrode 115 is formed on the lower substrate 114, and the piezoelectric body 113 is disposed on the shield electrode 115. The shield electrode 115 is disposed on an opposite side of a side with the operation surface 100A where an object, that is, a hand, approaches, relative to the first electrode 111 and the second electrode 112.

The first and second electrodes 111 and 112 are diamond-shaped patterned electrodes in plan view, and in FIG. 5C, a bridge portion in which the first and second electrodes 111 and 112 cross over each other is omitted.

The shield electrode 115 is disposed to shield the first and second electrodes 111 and 112 on the operation surface 100A side from noise and to suppress parasitic capacitance generated relative to the ground, and an AC voltage may be applied to the shield electrode 115 or the shield electrode 115 may be connected to the ground. When an AC voltage is applied, the signal applying unit applies a third frequency signal to a third electrode (shield electrode 115). The signal applying unit may also cause the shield electrode 115 to have a function of an active shield by setting a frequency of the third frequency signal to the same frequency as that of the first frequency signal when capacitance detection is performed. The shield electrode 115, as an example, is formed of a metallic foil made of copper or aluminum or a conductive film made of a transparent conductive material, such as an ITO film. The shield electrode 115 is a single electrode disposed throughout the proximity detection unit 110 in plan view. An AC voltage is applied to the shield electrode 115 when a hand position is detected by capacitance.

Figure 5D:
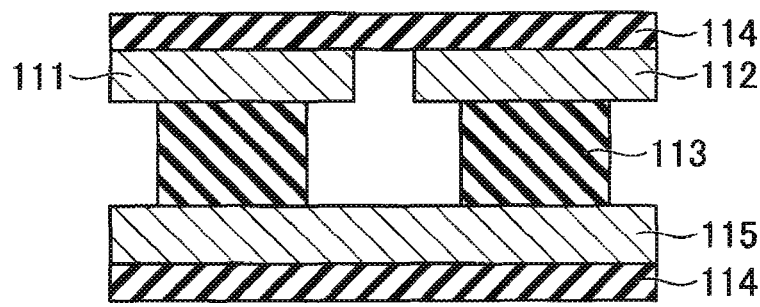
FIG. 5D is a diagram illustrating a modification of the intersection.

An intersection 110A illustrated in FIG. 5D is configured such that the piezoelectric body 113 of the intersection 110A illustrated in FIG. 5C is divided into two pieces so as to correspond to a first electrode 111 and a second electrode 112. For example, ultrasonic waves may be transmitted by the first electrode 111 and received by the second electrode 112.

Figure 6A:
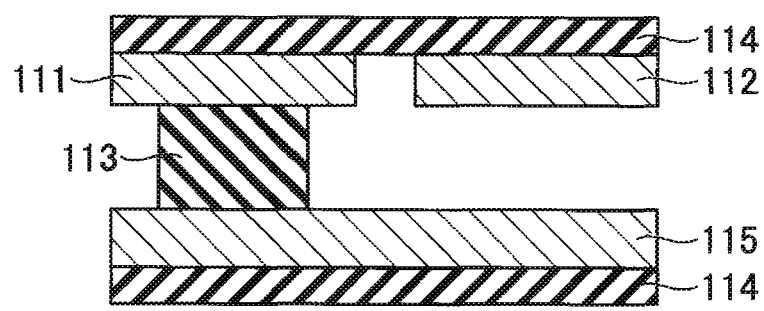
FIG. 6A is a diagram illustrating a modification of the intersection.
Figure 6B:
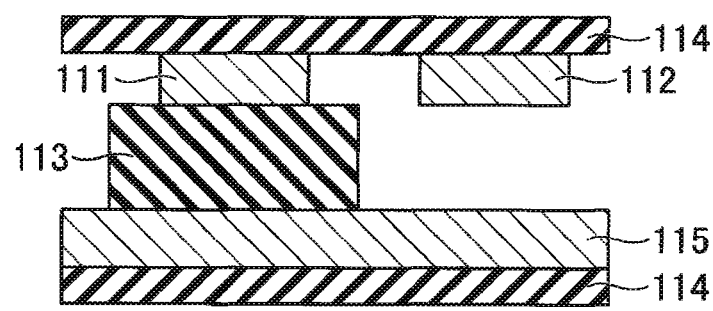
FIG. 6B is a diagram illustrating a modification of the intersection.

An intersection 110A illustrated in FIG. 6A is configured such that the piezoelectric body 113 under the second electrode 112 is removed from the intersection 110A of FIG. 5D. An intersection 110A illustrated in FIG. 6B is configured such that first and second electrodes 111 and 112 are thinner than those of the intersection 110A of FIG. 6A.

Figure 7A:
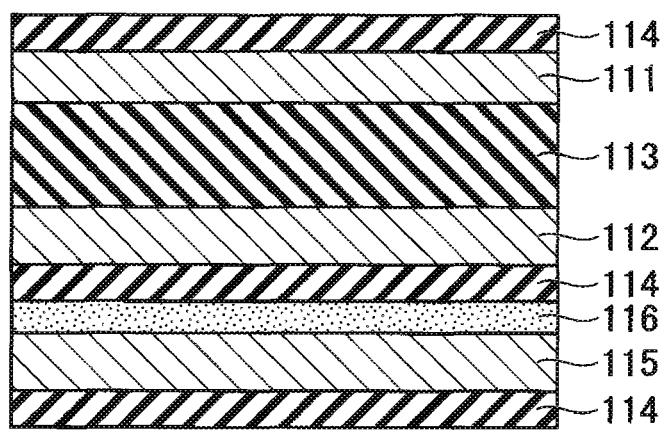
FIG. 7A is a diagram illustrating a modification of the intersection.

An intersection 110A illustrated in FIG. 7A includes a first electrode 111, a second electrode 112, a piezoelectric body 113, three substrates 114, a shield electrode 115, and an OCA (optical clear adhesive) 116. The intersection 110A illustrated in FIG. 7A is configured such that, on the lowest one of the substrates 114, the shield electrode 115, the OCA 116, one of the other substrates 114, the second electrode 112, the piezoelectric body 113, the first electrode 111, and the remaining substrate 114 are layered. In other words, the intersection 110A of FIG. 7A is configured such that the third substrate 114 with the shield electrode 115 disposed on one surface thereof is bonded with the OCA 116 under the substrate 114 on a lower side of the intersection 110A illustrated in FIG. 2. As with the intersection 110A of FIG. 5C, an AC voltage is applied to the shield electrode 115 when detection of a position of a hand is performed using capacitance.

Figure 7B:
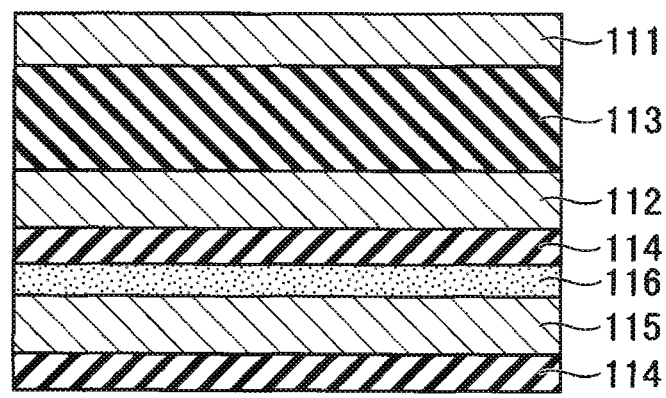
FIG. 7B is a diagram illustrating a modification of the intersection.

An intersection 110A illustrated in FIG. 7B is configured such that the uppermost substrate 114 of the intersection 110A of FIG. 7A is removed. In other words, the intersection 110A of FIG. 7B is configured such that the third substrate 114 with the shield electrode 115 disposed on one surface thereof is bonded with the OCA 116 under the intersection 110A of FIG. 4A.

Figure 7C:
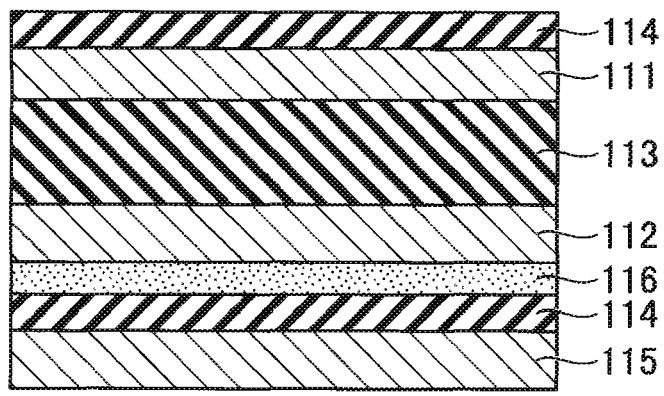
FIG. 7C is a diagram illustrating a modification of the intersection.

An intersection 110A illustrated in FIG. 7C is configured such that the substrate 114 under the second electrode 112 of the intersection 110A of FIG. 7A is removed and the substrate 114 with the shield electrode 115 disposed thereon is flipped upside down. The substrate 114 with the shield electrode 115 disposed thereon may be flipped upside down from that in FIG. 7A, with the shield electrode 115 down, and bonded under the second electrode 112 with the OCA 116.

<Proximity Detection Device 100M of Modification of Embodiment>

Figure 8:
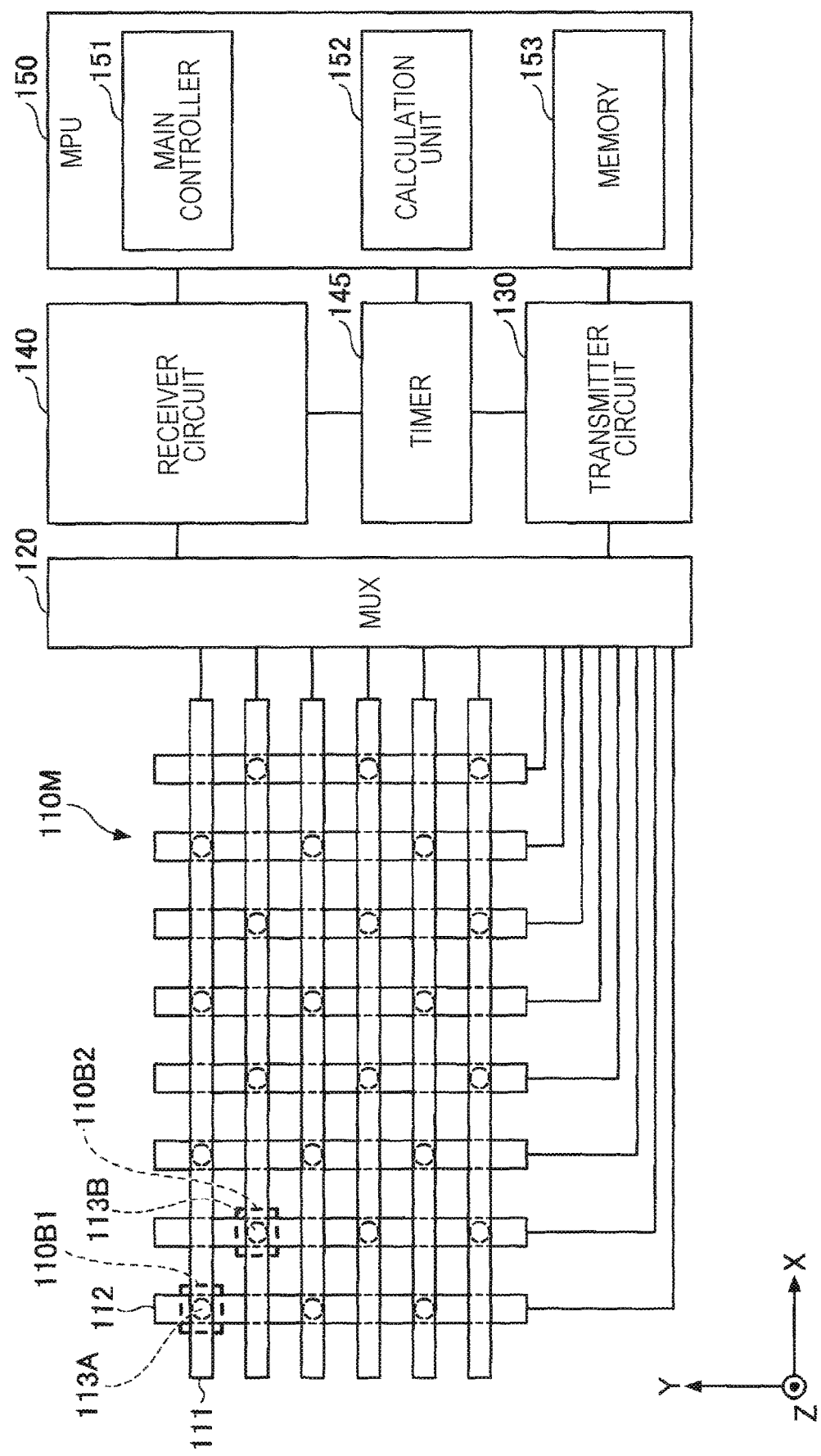
FIG. 8 is a diagram illustrating an example of a proximity detection device according to a modification of the embodiment.

FIG. 8 is a diagram illustrating an example of a proximity detection device 100M according to a modification of the embodiment. The proximity detection device 100M includes a proximity detection unit 110M instead of the proximity detection unit 110 illustrated in FIG. 1. The other configuration is the same as the proximity detection device 100 illustrated in FIG. 1. Here, differences will be described.

Instead of the configuration in which the piezoelectric bodies 113 are disposed at all the intersections 110A between the first and second electrodes 111 and 112 as illustrated in the proximity detection unit 110 of FIG. 1, the proximity detection unit 110M is configured such that piezoelectric bodies 113A for transmitting ultrasonic waves and piezoelectric bodies 113B for receiving ultrasonic waves are disposed between the first and second electrodes 111 and 112 at intersections 110B1 and 110B2, respectively.

The different intersections 110B1 and 110B2 are arranged to include different first electrodes 111 in the plurality of first electrodes 111 every other first electrode 111. Furthermore, the different intersections 110B1 and 110B2 are arranged to include different first electrodes 111 in the plurality of second electrodes 112 every other second electrode 112.

The intersections 110B1 and 110B2 are not adjacent to each other in the X and Y directions in a plan view and are diagonally positioned. The piezoelectric bodies 113A used for transmitting ultrasonic waves and the piezoelectric bodies 113B used for receiving ultrasonic waves have the same configuration as the piezoelectric bodies 113 of the proximity detection device 100.

In the proximity detection device 100M having this configuration, when ultrasonic waves are transmitted, the first and second electrodes 111 and 112 included in the intersections 110B1 are selected by the MUX 120 to apply an AC signal for ultrasonic waves to the first and second electrodes 111 and 112, thereby applying the AC signal for ultrasonic waves to the piezoelectric bodies 113A.

Furthermore, when ultrasonic waves are received, the first and second electrodes 111 and 112 included in the intersections 110B2 are selected by the MUX 120, and a waveform produced by charge between the first and second electrodes 111 and 112 is acquired by the receiver circuit 140.

A method for performing position detection using capacitance in the proximity detection device 100M is the same as the method for performing position detection using capacitance in the proximity detection device 100.

By separating the piezoelectric bodies 113A used for transmitting ultrasonic waves from the piezoelectric bodies 113B used for receiving ultrasonic waves, as in the proximity detection device 100M according to the modification of the embodiment, the switching control performed by the MUX 120 and control of the waveform acquisition performed by the receiver circuit 140 are simplified when a distance to a hand is detected using ultrasonic waves. In addition, since the functions of transmitter and receiver are separated from each other, it is advantageous that performance of the device is easily improved.

Although the exemplary embodiment of the proximity detection device according to the present invention has been described hereinabove, the present invention is not limited to the embodiment disclosed in detail, and various modifications and changes may be made without departing from claims.

What is claimed is:

1. A proximity detection device, comprising:
a proximity detection unit capable of detecting proximity of an object, based on a capacitance formed between the object and the proximity detection unit and an ultrasonic wave transmitted to and reflected from the object, the proximity detection unit including:
at least one piezoelectric body; and
at least one first electrode and at least one second electrode disposed in contact with the at least one piezoelectric body, such that the piezoelectric body is disposed between the first electrode and the second electrode at an intersection of the first electrode and the second electrode, while the first electrode and the second electrode are insulated from each other without contacting with the piezoelectric body at portions other than the intersection;
a signal applying unit configured to cause the proximity detection unit to perform capacitance detection, or to perform ultrasonic detection by transmitting and/or receiving ultrasonic waves, by selectively applying a plurality of signals of different frequencies to at least one of the first and second electrodes, the plurality of signals including a first frequency signal for the capacitance detection and a second frequency signal for the ultrasonic detection;
a charge measurement unit connected to at least one of the first and second electrodes, configured to measure an electric charge on the at least one of the first and second electrodes; and
a calculation unit configured to calculate a distance between the object and the proximity detection unit,
wherein the signal applying unit is further configured, when the second frequency signal has been applied to cause the proximity detection unit to perform the ultrasonic detection, and if the distance between the object and the proximity detection unit calculated by the calculation unit is equal to or smaller than a predetermined distance, to select the first frequency signal instead and cause the proximity detection unit to perform the capacitance detection.

2. The proximity detection device according to claim 1, wherein the proximity detection unit is configured to transmit an ultrasonic wave and then receive a reflected ultrasonic wave which is the ultrasonic wave reflected by the object.

3. The proximity detection device according to claim 1, wherein the calculation unit is further configured to obtain a result of the capacitance detection and/or a result of the ultrasonic detection, based on the first or second frequency signal selected by the signal applying unit and the electric charge measured by the charge measurement unit, and calculates the distance between the object and the proximity detection unit based on the obtained result.

4. The proximity detection device according to claim 3, wherein the calculation unit obtains the result of the capacitance detection which is an amount of the electric charge measured by the charge measurement unit, when the first frequency signal is selected by the signal applying unit.

5. The proximity detection device according to claim 3, wherein the calculation unit obtains the result of the ultrasonic detection which is a period of time between the transmitting an ultrasonic wave and receiving a reflected ultrasonic wave which is the ultrasonic wave reflected by the object, when the second frequency signal is selected by the signal applying unit.

6. The proximity detection device according to claim 3, wherein the signal applying unit is further configured to switch between applying the first frequency signal and applying the second frequency signal in a time-division manner.

7. The proximity detection device according to claim 3, further comprising:
a timer configured to measure a period of time from an application of the second frequency signal by the signal applying unit to a measurement of the electric charge based on reception of an ultrasonic wave which corresponds to the second frequency signal and has been reflected by the object,
wherein the calculation unit is further configured to calculate the distance between the object and the proximity detection unit based on the period of time measured by the timer.

8. The proximity detection device according to claim 3, wherein the calculation unit is configured to detect a two-dimensional profile or a three-dimensional image of the object, based on an amount of electric charge measured by the charge measurement unit and/or a period of time from transmitting the ultrasonic wave to receiving the ultrasonic wave reflected by the object.

9. The proximity detection device according to claim 1, wherein the proximity detection unit comprises:
a plurality of first electrodes; and
a plurality of second electrodes.

10. The proximity detection device according to claim 9, wherein each of the plurality of first electrodes extends in a first direction, the plurality of first electrodes being arranged side by side in a second direction that intersects with the first direction,
wherein each of the plurality of second electrodes extends in the second direction, the plurality of second electrodes being arranged side by side in the first direction, and wherein a plurality of piezoelectric bodies are sandwiched between the plurality of first and second electrodes at positions where the first and second electrodes intersect with each other.

11. The proximity detection device according to claim 1, further comprising:
a third electrode disposed on an opposite side of the first and second electrodes opposite to a detection side of the first and second electrodes which the object approaches.

12. The proximity detection device according to claim 11, wherein the third electrode is connected to a ground.

13. The proximity detection device according to claim 11, wherein the signal applying unit is further configured to apply a third frequency signal to the third electrode.

14. The proximity detection device according to claim 1, wherein the piezoelectric body is an electret having piezoelectric properties.

* * * * *